US005509207A

United States Patent [19]

Harms

[11] Patent Number: 5,509,207

[45] Date of Patent: Apr. 23, 1996

[54] SPEED LAYOUT STICK

[76] Inventor: Dale N. Harms, 7311 Glen Oaks Way, Dublin, Calif. 94568

[21] Appl. No.: 303,633

[22] Filed: Sep. 9, 1994

[51] Int. Cl.$^{6}$ .......... B43L 13/02; G01D 21/00

[52] U.S. Cl. .......... 33/41.4; 33/613

[58] Field of Search .......... 33/1 G, 1 F, 32.1, 33/32.2, 41.1, 41.4, 44, 41.2, 613, 562

[56] References Cited

U.S. PATENT DOCUMENTS

| | | | |
|---|---|---|---|
| 897,987 | 9/1908 | Mezger | 33/44 |
| 900,880 | 10/1908 | Packer | 33/41.1 |
| 2,428,213 | 9/1947 | Gloede | 33/41.1 |
| 2,471,193 | 5/1949 | Brower | 33/41.4 |
| 2,686,959 | 8/1954 | Robinson | 33/613 |
| 3,628,253 | 12/1971 | Shepard | 101/368 |
| 4,455,750 | 6/1984 | Sturz | 33/44 |
| 4,527,337 | 7/1985 | Dreiling | 33/613 |
| 4,958,814 | 9/1990 | Johnson | 33/613 |
| 5,291,663 | 3/1994 | Briglia et al. | 33/613 |

FOREIGN PATENT DOCUMENTS

| | | | |
|---|---|---|---|
| 52923 | 4/1937 | Denmark | 33/41.4 |
| 71030 | 1/1893 | Germany | 33/41.4 |
| 332937 | 2/1921 | Germany | 33/41.4 |
| 1165236 | 3/1964 | Germany | 33/613 |
| 363384 | 2/1939 | Italy | 33/41.4 |

*Primary Examiner*—Thomas B. Will

[57] ABSTRACT

A speed layout stick comprised of an oblong bar having a handle secured to the midpoint thereof. The oblong bar has a length of sixty-four inches. The oblong bar has four pair of apertures formed therethrough at areas spaced at sixteen inch intervals. Four pair of lead holders are secured to the oblong bar adjacent the four pair of apertures. Each of the four pair of lead holders have a pull pin thereattached. The pull pin functions to removably secure an object within the lead holders. A plurality of lead sticks are received through each of the apertures of the oblong bar and each of the lead holders and secured therein by the pull pin. The lead sticks function to draw lines on a surface.

6 Claims, 4 Drawing Sheets

SPEED LAYOUT STICK

BACKGROUND OF THE INVENTION

1. Field of the Invention

The present invention relates to a speed layout stick and more particularly pertains to providing a method for drawing eight lines with a single push on a crossbar with a speed layout stick.

2. Description of the Prior Art

The use of layout tools is known in the prior art. More specifically, layout tools heretofore devised and utilized for the purpose of framing marking are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,212,108 to Jackson discloses a layout tool for framing studs.

U.S. Pat. No. 4,499,666 to Smith discloses a universal framing layout tool.

U.S. Pat. No. 4,527,337 to Dreiling discloses a framing stud template.

U.S. Pat. No. 3,628,253 to Shepard discloses an extensible construction marker.

U.S. Pat. No. Des. 314,520 discloses the ornamental design for a construction stud layout tool.

While these devices fulfill their respective, particular objective and requirements, the aforementioned patents do not describe a speed layout stick for providing a method for drawing eight lines with a single push on a crossbar.

In this respect, the speed layout stick according to the present invention substantially departs from the conventional concepts and designs of the prior art, and in doing so provides an apparatus primarily developed for the purpose of providing a method for drawing eight lines with a single push on a crossbar.

Therefore, it can be appreciated that there exists a continuing need for a new and improved speed layout stick which can be used for providing a method for drawing eight lines with a single push on a crossbar. In this regard, the present invention substantially fulfills this need.

SUMMARY OF THE INVENTION

In the view of the foregoing disadvantages inherent in the known types of layout tools now present in the prior art, the present invention provides an improved speed layout stick. As such, the general purpose of the present invention, which will be described subsequently in greater detail, is to provide a new and improved speed layout stick and method which has all the advantages of the prior art and none of the disadvantages.

To attain this, the present invention essentially comprises an oblong bar having an upper surface and a lower surface. A handle is secured to the upper surface at a midpoint thereof. The oblong bar has a length of sixty-four inches. The oblong bar has four pair of apertures formed therethrough at areas spaced at sixteen inch intervals. Each of the four pair of apertures parallel an existing layout stick. The device contains four pair of lead holders that are secured to the lower surface of the oblong bar adjacent the four pair of apertures. Each of the four pair of lead holders have a pull pin thereattached. The pull pin functions to removably secure an object within the lead holders. The device contains a plurality of lead sticks received through each of the apertures of the oblong bar and each of the lead holders and secured therein by the pull pin. The lead sticks function to draw lines on a surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved speed layout stick which has all the advantages of the prior art layout tools and none of the disadvantages.

It is another object of the present invention to provide a new and improved speed layout stick which may be easily and efficiently manufactured and marketed.

It is a further object of the present invention to provide a new and improved speed layout stick which is of durable and reliable construction.

An even further object of the present invention is to provide a new and improved speed layout stick which is susceptible of a low cost of manufacture with regard to both materials and labor, and which accordingly is then susceptible of low prices of sale to the consuming public, thereby making such a speed layout stick economically available to the buying public.

Still yet another object of the present invention is to provide a new and improved speed layout stick which provides in the apparatuses and methods of the prior art some of the advantages thereof, while simultaneously overcoming some of the disadvantages normally associated therewith.

Even still another object of the present invention is to provide a new and improved speed layout stick for providing a method for drawing eight lines with a single push on a crossbar.

Lastly, it is an object of the present invention to provide a new and improved speed layout stick comprised of an oblong bar having a handle secured to the midpoint thereof. The oblong bar has a length of sixty-four inches. The oblong bar has four pair of apertures formed therethrough at areas spaced at sixteen inch intervals. Four pair of lead holders are secured to the oblong bar adjacent the four pair of apertures. Each of the four pair of lead holders have a pull pin thereattached. The pull pin functions to removably secure an object within the lead holders. A plurality of lead sticks are received through each of the apertures of the oblong bar and each of the lead holders and secured therein by the pull pin. The lead sticks function to draw lines on a surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
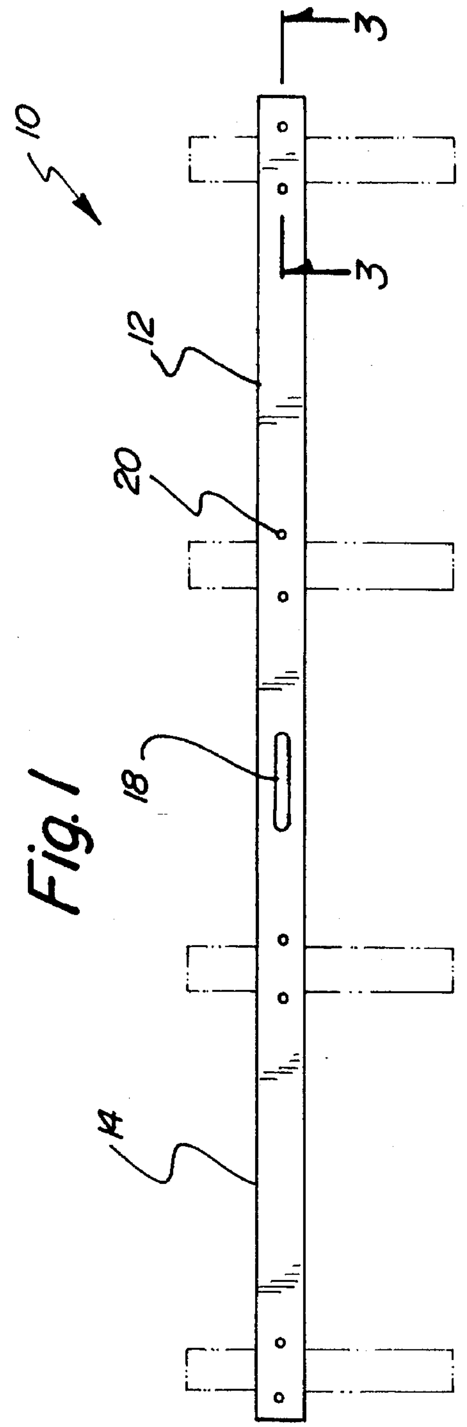
FIG. 1 is a plan view of the preferred embodiment of the present invention.
Figure 2:
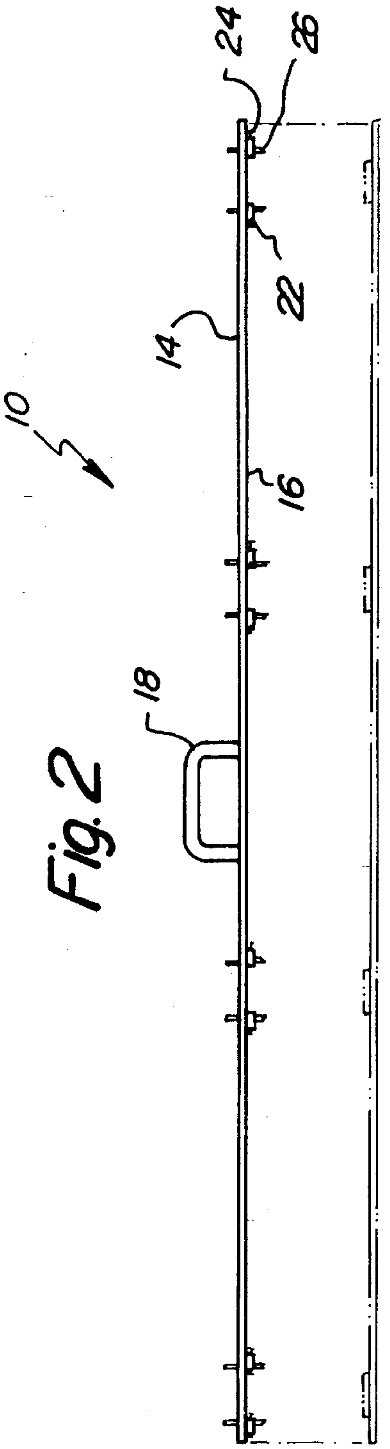
FIG. 2 is a side view of the preferred embodiment of the present invention.
Figure 3:
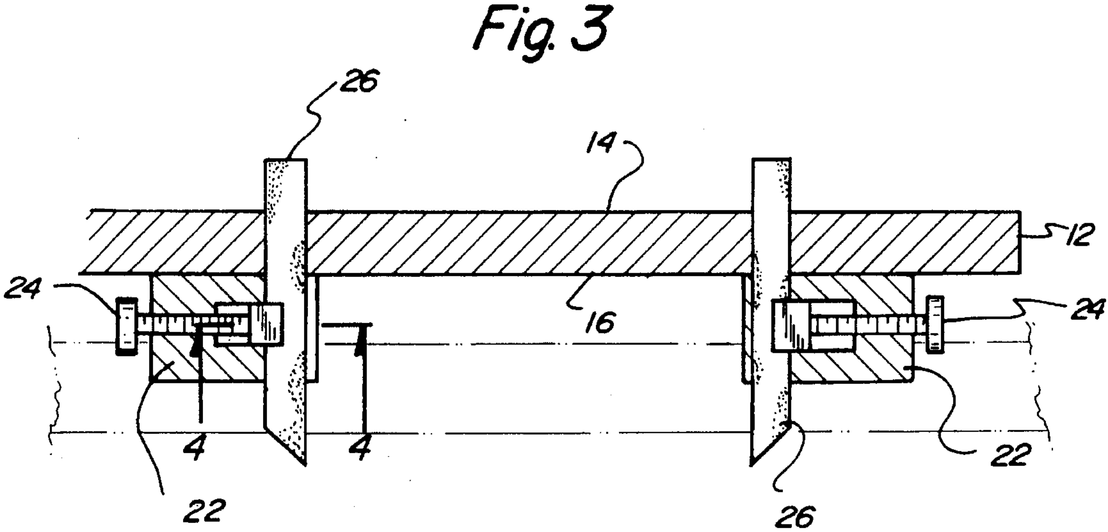
FIG. 3 is a cross-sectional view taken along line 3—3 of FIG. 1.
Figure 4:
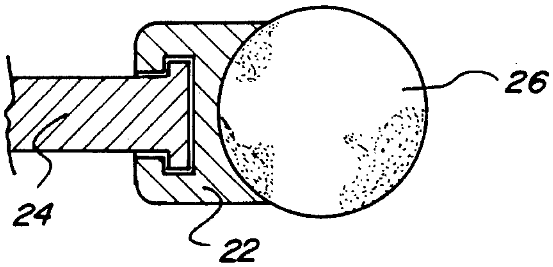
FIG. 4 is a cross-sectional view taken along line 4—4 of FIG. 3.

With reference now to the drawings, and in particular, to FIG. 1 thereof, the preferred embodiment of the new and improved speed layout stick embodying the principles and concepts of the present invention and generally designated by the reference number 10 will be described.

Specifically, it will be noted in the various Figures that the device relates to a new and improved speed layout stick for providing a method for drawing eight lines with a single push on a crossbar. In its broadest context, the device consists of an oblong bar, four pair of lead holders, and a plurality of lead sticks.

The device 10 contains an oblong bar 12 having an upper surface 14 and a lower surface 16. A handle 18 is secured to the upper surface 14 at a midpoint thereof. The oblong bar 12 has a length of sixty-four inches. The oblong bar 12 has four pair of apertures 20 formed therethrough at areas spaced at sixteen inch intervals. Each of the four pair of apertures 20 straddle an existing layout stick. The oblong bar is preferably constructed of a lightweight aluminum that is durable enough to hold up to frequent use.

The device 10 contains four pair of lead holders 22 that are secured to the lower surface 16 of the oblong bar 12 adjacent the four pair of apertures 20. Each of the four pair of lead holders 22 have a pull pin 24 thereattached. The pull pin 24 functions to removably secure an object within the lead holders 22.

The device 10 contains a plurality of lead sticks 26 received through each of the apertures 20 of the oblong bar 12 and each of the lead holders 22 and secured therein by the pull pin 24. The lead sticks 26 function to draw lines on a surface. The lead sticks would be easily replaced once the lead is diminished. By pulling or pushing on the handle 18, tho oblong bar 12 moves paralleling the layout stick and the lead sticks 26 draw eight lines at once, thus saving time and increasing the accuracy of the lines. This feature would give a decided advantage over the competition because it will draw lines eight times faster.

Figure 5:
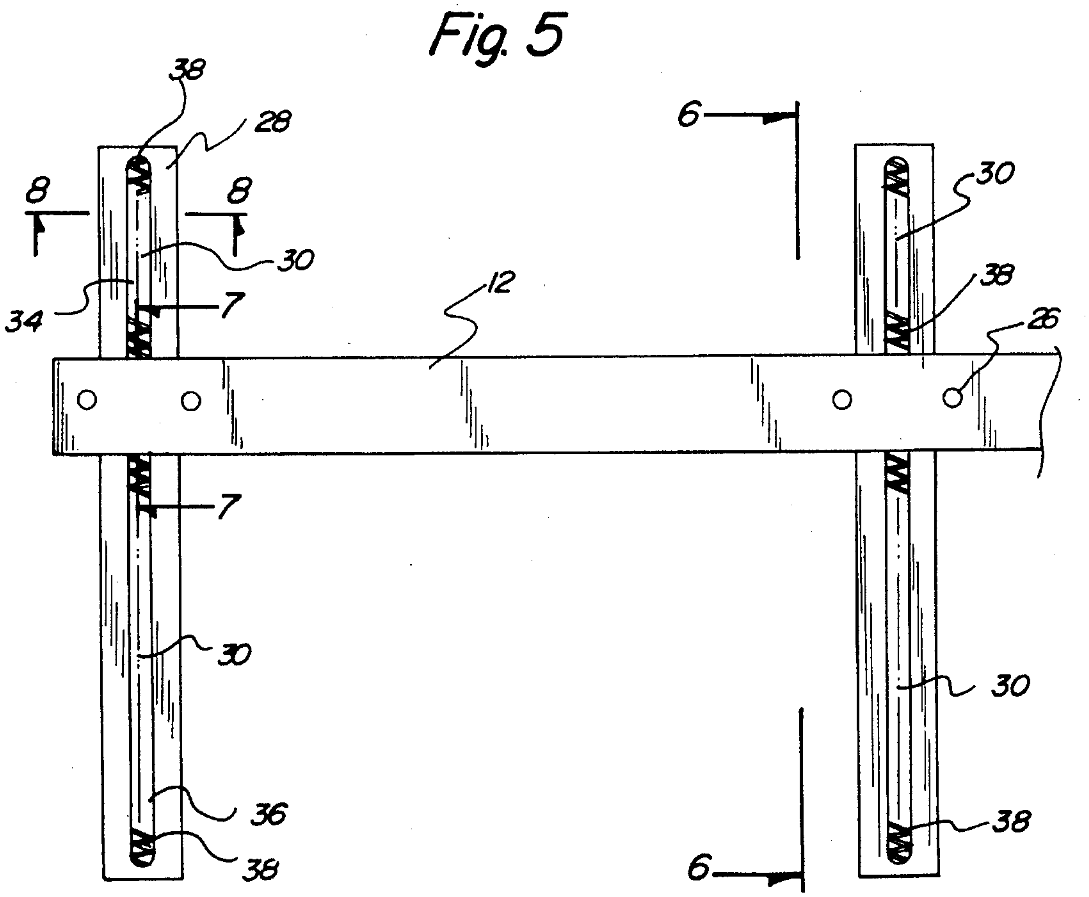
FIG. 5 is a plan view of the second embodiment of the present invention.
Figure 6:
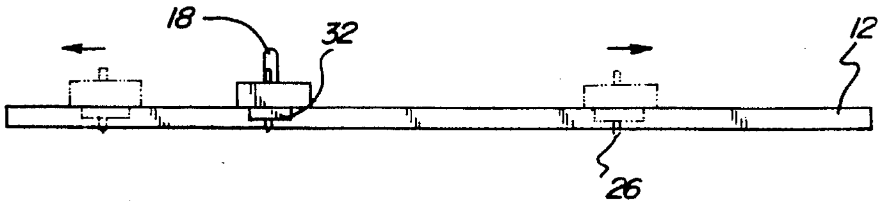
FIG. 6 is a cross-sectional view taken along line 6—6 of FIG. 5.
Figure 7:
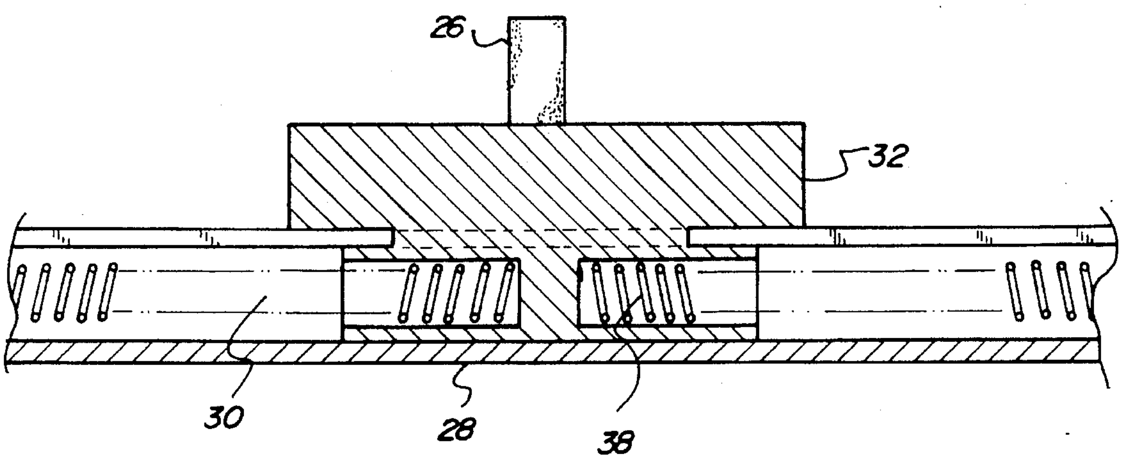
FIG. 7 is a cross-sectional view taken along line 7—7 of FIG. 5.
Figure 8:
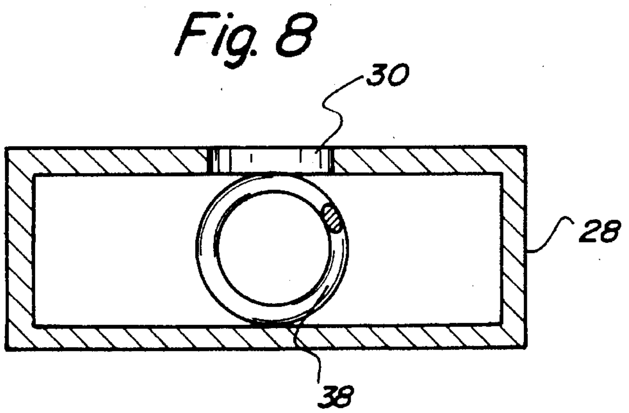
FIG. 8 is a cross-sectional view taken along line 8—8 of FIG. 5.

A second embodiment of the present invention is shown in FIG. 5 and includes substantially all of the components of the present invention further including four layout sticks 28 are each secured between the four pair of apertures 20 of the oblong bar 12. The four layout sticks 28 each have a central groove 30 therein. The central groove 30 has a carrier 32 therein. The carrier 32 functions to divide the central groove 30 into an upward area 34 and a backward area 36. A pair of springs 38 are secured within the upward area 34 and the backward area 36. The springs 38 function to rebound the oblong bar 12 to a starting position after drawing lines on a surface. The springs 38 return the oblong bar 12 to the starting position to reposition the layout sticks against an edge.

The present invention is a carpenter's fixture which will draw eight lines with a single push on a crossbar.

The fixture consists of a flat aluminum bar, across which are mounted four sets of guides, spaced at the desired distances and spring loaded to position them against the edge. Leads, or pencils, extend down each side of the guides, set apart at specific dimensions which may or may not be adjustable.

When the fixture is set along on a piece of lumber and the crossbar is pushed, in one stroke eight lines are drawn across the surface being marked, spaced as desired. One typical application for this device is in the building of homes in production quantities. It can be arranged to lay out the location of the studs on top and bottom plates for walls, so they can be nailed at the code spacing of 16" between centers. One plate is placed on top of the other, and the fixture is used to mark both edges in a single stroke.

The fixture can also be used on other applications by making the positioning of the leads adjustable. On precut homes, a carpenter can lay out the plates for each section in a very short time. They would be perfectly identical, and the labor costs would be reduced to a minimum. The building standards make such a fixture applicable to most homes. Once set up, it can be used from home to home, regardless of the design.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A new and improved speed layout stick for providing a method for drawing eight lines with a single push on a crossbar comprising, in combination:

an oblong crossbar having an upper surface and a lower surface, a handle secured to the upper surface at a midpoint thereof, the oblong crossbar having a length of sixty-four inches, the oblong crossbar having four pair of apertures formed therethrough at areas spaced at sixteen inch intervals, each of the four pair of apertures straddling an existing layout stick;

four pair of lead holders secured to the lower surface of the oblong crossbar adjacent the four pair of apertures, each of the lead holders having a pull pin thereattached, the pull pin functioning to removably secure an object within the lead holder;

a plurality of lead sticks, each lead stick received through one of the apertures of the oblong crossbar and one of the lead holders and secured therein by the pull pin, the lead sticks functioning to draw lines on a surface.

2. A new and improved speed layout stick for providing a method for drawing eight lines with a single push on a crossbar comprising, in combination:

an oblong crossbar having a handle secured to the midpoint thereof, the oblong crossbar having a length of sixty-four inches, the oblong crossbar having four pair of apertures formed therethrough at areas spaced at sixteen inch intervals;

four pair of lead holders secured to the oblong crossbar adjacent the four pair of apertures, each of the lead holders having a pull pin thereattached, the pull pin functioning to removably secure an object within the lead holder;

a plurality of lead sticks, each lead stick received through one of the apertures of the oblong crossbar and one of the lead holders and secured therein by the pull pin, the lead sticks functioning to draw lines on a surface.

3. The device as described in claim 2 wherein four layout sticks are each positioned between the four pair of apertures of the oblong bar.

4. The device as described in claim 3 wherein the four layout sticks each having a central groove therein.

5. The device as described in claim 4 wherein the central groove having a carrier therein functioning to divide the central groove into an upward area and a backward area.

6. The device as described in claim 5 wherein a pair of springs secured within the upward area and the backward area functioning to rebound the oblong crossbar to a starting position after drawing lines on a surface.

* * * * *